US011823335B2

(12) United States Patent
Dong et al.

(10) Patent No.: US 11,823,335 B2
(45) Date of Patent: Nov. 21, 2023

(54) TOUR GUIDING METHOD, ELECTRONIC DEVICE AND STORAGE MEDIUM

(71) Applicant: Beijing Baidu Netcom Science Technology Co., Ltd., Beijing (CN)

(72) Inventors: Yuhua Dong, Beijing (CN); Ziwen Qin, Beijing (CN); Zhaohu Li, Beijing (CN); Zhaoliang Liu, Beijing (CN); Zhihao Wang, Beijing (CN); Haoxing Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 194 days.

(21) Appl. No.: 17/498,204

(22) Filed: Oct. 11, 2021

(65) Prior Publication Data

US 2022/0028177 A1  Jan. 27, 2022

(30) Foreign Application Priority Data

Nov. 11, 2020 (CN) .......................... 202011254365.9

(51) Int. Cl.
*G06T 19/00* (2011.01)
*G06T 17/00* (2006.01)
(Continued)

(52) U.S. Cl.
CPC ........... *G06T 19/006* (2013.01); *G06Q 50/14* (2013.01); *G06T 17/00* (2013.01); *G06V 20/41* (2022.01); *H04W 4/021* (2013.01); *H04W 4/025* (2013.01)

(58) Field of Classification Search
None
See application file for complete search history.

(56) References Cited

U.S. PATENT DOCUMENTS 8,331,611 B2 * 12/2012 Johnson, II ......... G06F 16/9537
382/100
10,484,643 B2 * 11/2019 Moran .................. G06T 19/006
(Continued)

FOREIGN PATENT DOCUMENTS

CN 109143207 A 1/2019
CN 110163903 A 8/2019
(Continued)

OTHER PUBLICATIONS

Notice of Reasons for Refusal dated Jan. 4, 2023, for Japanese Patent Application No. 2021-168950 (10 pages).
(Continued)

*Primary Examiner* — David H Chu
(74) *Attorney, Agent, or Firm* — KDW Firm PLLC

(57) ABSTRACT

Provided are a tour guiding method and apparatus, an electronic device and a storage medium. The method includes receiving a video stream collected by a user in a current location area of a target scenic spot and sent by an application device; determining, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of the application device; and sending the augmented-reality-based content resource package corresponding to the current location area to the application device to enable the application device to provide the augmented-reality-based content resource package corresponding to the front location area for the user.

17 Claims, 5 Drawing Sheets

(51) Int. Cl.
*G06V 20/40* (2022.01)
*G06Q 50/14* (2012.01)
*H04W 4/021* (2018.01)
*H04W 4/02* (2018.01)

(56) References Cited

U.S. PATENT DOCUMENTS

| | | | | |
|---|---|---|---|---|
| 2009/0002394 | A1* | 1/2009 | Chen | G06T 3/4038 |
| | | | | 345/632 |
| 2013/0002649 | A1 | 1/2013 | Wu | |
| 2016/0330532 | A1* | 11/2016 | Bostick | H04N 5/272 |
| 2017/0337739 | A1* | 11/2017 | Wu | G06T 19/006 |
| 2018/0329485 | A1 | 11/2018 | Carothers | |
| 2019/0149725 | A1* | 5/2019 | Adato | H04N 1/00 |
| | | | | 348/158 |
| 2020/0193717 | A1* | 6/2020 | Daly | G06N 3/045 |
| 2021/0289297 | A1* | 9/2021 | Souviraa-Labastie | |
| | | | | H04S 7/304 |

FOREIGN PATENT DOCUMENTS

| | | |
|---|---|---|
| CN | 110784705 A | 2/2020 |
| CN | 110866977 A | 3/2020 |
| CN | 111259755 A | 6/2020 |
| CN | 111382613 A | 7/2020 |
| JP | 2020077498 A | 5/2020 |
| WO | 2020011738 A1 | 1/2020 |

OTHER PUBLICATIONS

Sato et al., Image Measuring for Measurement of Image and Pattern—VR/MR, Measurement, Control, Japan, Society of Instrument and Control Engineers, Jan. 10, 2008, and 47th vol. No. 1, pp. 30-35.

Lin Li et al, "The Intelligent Terminal Guide System Based on Augmented Reality Technology," Xinjiang Institute of Electronics, Software Engineering, vol. 20, No. 17, Dec. 2017.

Chinese Search Report for Application No. 2020112543659 dated Jul. 17, 2023.

Chinese Office Action for Application No. 2020112543659 dated Jul. 19, 2023.

* cited by examiner

TOUR GUIDING METHOD, ELECTRONIC DEVICE AND STORAGE MEDIUM

CROSS-REFERENCES TO RELATED APPLICATIONS

This application claims priority to a Chinese patent application No. 202011254365.9 filed on Nov. 11, 2020, the disclosure of which is incorporated herein by reference in its entirety.

TECHNICAL FIELD

The present application relates to the field of artificial intelligence such as augmented reality and image technologies, particularly a tour guiding method and apparatus, an electronic device and a storage medium.

BACKGROUND

With the rapid development of tourism, more and more people choose a self-guided tour. However, a scenic spot themed at humanities, architecture, history or the like relies heavily on the escort of a tour guide so that the knowledge and fun of travel are increased. Additionally, in some scenic areas, a paid audio guide is available for a tourist, and the tourist can listen to an interpretation of a particular scenic spot after clicking a button according to a designated tour route or can listen to an audio interpretation via Bluetooth or Wi-Fi.

An audio guide, an audio interpretation product based on the Global Positioning System (GPS)/Wi-Fi/Bluetooth positioning, provides a service of repeatedly playing back pre-recorded audio material classified by scenic spot. An audio guide is limited in use in that it can provide only an audio interpretation and cannot serve as a tour guide who can interpret designated locations and details in a real scenario. Moreover, the problem in which currently played audio content does not match visible content tends to occur in use. Furthermore, a service triggered based on image recognition and search is similar to audio interpretation, and the triggered content may be scenic spot introduction of an image and text version that cannot be viewed and listened to simultaneously in conjunction with a real scenario. Additionally, AR based on 2D image recognition and tracking is applicable to limited scenarios such as packaging and printing scenarios and is not applicable to large-scale scenarios such as scenic areas and buildings. The AR does not allow multiangular recognition and triggering or allow intelligent triggering by orientation sensitivity and thus cannot improve the continuous experience. Moreover, in a large-scale or complex scenic spot, many small ornaments and gadgets are shown to a tourist. In this case, the tourist is easily attracted to these small ornaments and gadgets and thus does not pay attention to the content of audio interpretation. As a result, the content of audio interpretation cannot well match the sightline of the tourist in real time.

SUMMARY

The present application provides a tour guiding method, an electronic device and a storage medium.

In a first aspect, the present application provides a tour guiding method. The method includes receiving a video stream collected by a user in a current location area of a target scenic spot and sent by an application device; determining, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of the application device; and sending the augmented-reality-based content resource package corresponding to the current location area to the application device to enable the application device to provide the augmented-reality-based content resource package corresponding to the front location area for the user.

In a second aspect, the present application provides a tour guiding method. The method includes acquiring a video stream collected by a user in a current location area of a target scenic spot; sending the collected video stream to a server device to enable the server device to determine, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of an application device; and receiving the augmented-reality-based content resource package corresponding to the current location area and sent by the application device and providing the augmented-reality-based content resource package corresponding to the current location area for the user.

In a third aspect, the present application provides an electronic device. The electronic device includes one or more processors and a memory for storing one or more programs.

When executed by the one or more processors, the one or more programs cause the one or more processors to perform the augmented-reality-based tour guiding method as described in any one of embodiments of the present application.

In a fourth aspect, the present application provides a storage medium. The storage medium stores one or more computer programs. When executed by one or more processors, the one or more programs cause the one or more processors to perform the augmented-reality-based tour guiding method as described in any one of embodiments of the present application.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present application.

DETAILED DESCRIPTION

Example embodiments of the present application, including details of embodiments of the present application, are described hereinafter in connection with the drawings to facilitate understanding. The example embodiments are illustrative only. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

Embodiment One

Figure 1:
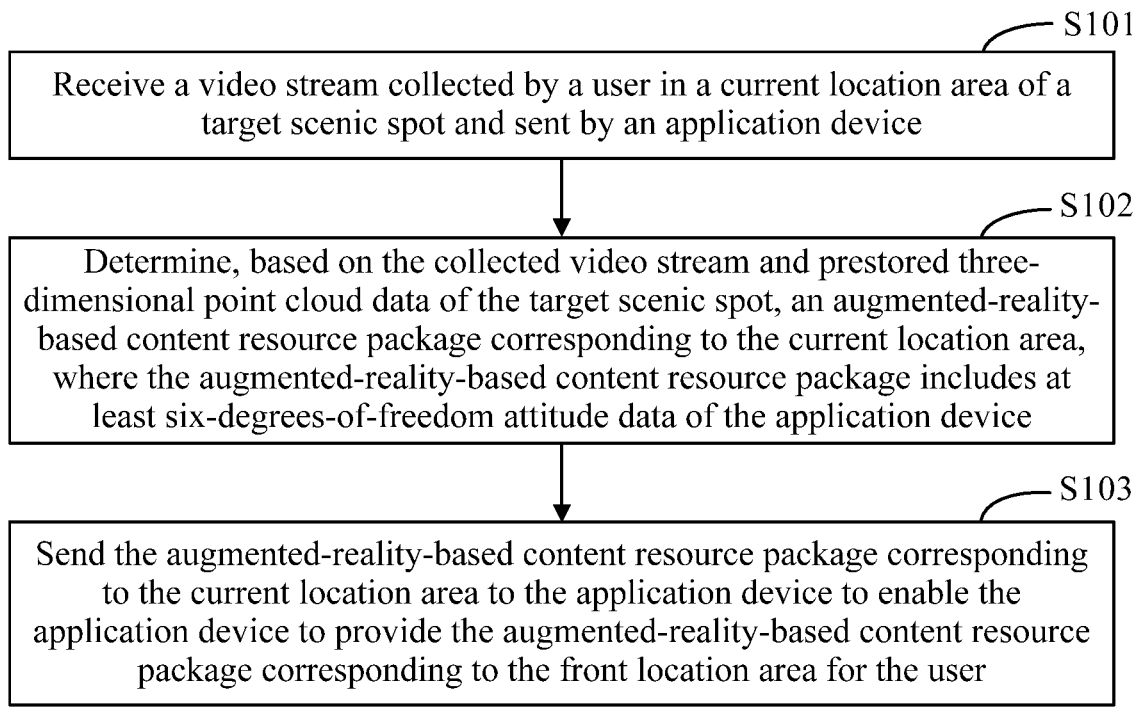
FIG. 1 is a first flowchart of a tour guiding method according to an embodiment of the present application.

FIG. 1 is a first flowchart of a tour guiding method according to an embodiment of the present application. The method may be performed by a tour guiding apparatus or a server device. The apparatus or the server device may be implemented as software and/or hardware. The apparatus or the server device may be integrated in any intelligent device having the network communication function. As shown in FIG. 1, the tour guiding method may include the steps below.

In S101, a video stream collected by a user in a current location area of a target scenic spot and sent by an application device is received.

In this step, a server device receives the video stream collected by the user in the current location area of the target scenic spot and sent by the application device. In an embodiment, the user may turn on a camera in the current location area of the target scenic spot, locally collect a video stream in real time, and perform continuous visual positioning and search. For example, when the user visits Mount Tai, assuming that the user enters through the east gate and then walks 100 meters west, the user may use a mobile terminal to collect a video stream while walking, send the collected video stream to the server device in real time. At this time, the server device can receive the video stream collected by the user in the current location area of the target scenic spot and sent by the application device.

In S102, an augmented-reality-based content resource package corresponding to the current location area is determined based on the collected video stream and prestored three-dimensional point cloud data of the target scenic spot, where the augmented-reality-based content resource package includes at least six-degrees-of-freedom attitude data of the application device.

In this step, the server device may determine, based on the collected video stream and prestored three-dimensional point cloud data of the target scenic spot, an augmented-reality-based content resource package corresponding to the current location area, where the augmented-reality-based content resource package includes at least the six-degrees-of-freedom attitude data of the application device. In an embodiment, the server device may determine, based on the collected video stream and the three-dimensional point cloud data of the target scenic spot, three-dimensional point cloud data of the current location area by using a lightweight three-dimensional visual-map generation model; and then acquire, based on the three-dimensional point cloud data of the current location area, the augmented-reality-based content resource package corresponding to the current location area. In an embodiment, the server device may first extract, from the video stream collected by the user, a local feature of the video stream and then match the local feature of the video stream to multiple features of the three-dimensional point cloud data of the target scenic spot; and if the local feature of the video stream can match at least one feature of the three-dimensional point cloud data of the target scenic spot successfully, the server device may determine the three-dimensional point cloud data of the current location area based on the successfully matched feature. In this embodiment of the present application, the augmented-reality-based content resource package includes the six-degrees-of-freedom attitude data of the application device so that the content of AR is closer to a real scenario and more realistic.

In S103, the augmented-reality-based content resource package corresponding to the current location area is sent to the application device to enable the application device to provide the augmented-reality-based content resource package corresponding to the front location area for the user.

In an implementation of the present application, the server device may send the augmented-reality-based content resource package corresponding to the current location area to the application device to enable the application device to provide the augmented-reality-based content resource package corresponding to the front location area for the user. The application device may provide, based on a location-based service (LBS) of the Global Positioning System (GPS), the augmented-reality-based content resource package corresponding to the current location area for the user; or provide, based on a text-to-speech (TTS) audio broadcast service, the augmented-reality-based content resource package corresponding to the current location area for the user.

In an embodiment, when using the GPS-based LBS map positioning service, the server device may perform outdoor initial GPS positioning in conjunction with the map positioning service of Baidu in the related art and improve the efficiency of a visual search service by reducing the search range in the case of a wide point-of-interest (POI) coverage area and a large amount of map data. Alternatively, the user enters and visits a designated scenic spot selected by the user, or the service is not used in the case of a small amount of data. Additionally, when using the TTS audio broadcast service, the server device may provide an interactive audio content broadcast service in conjunction with the TTS service of Baidu in the related art when producing and displaying the AR interactive content of the scenic spot. Alternatively, the content broadcast is performed by using a recorded MP3 audio.

In the tour guiding method provided in this embodiment of the present application, a server device receives a video stream collected by a user in a current location area of a target scenic spot and sent by an application device; the server device determines, based on the collected video stream and prestored three-dimensional point cloud data of the target scenic spot, an augmented-reality-based content resource package corresponding to the current location area; and then the server device sends the augmented-reality-based content resource package corresponding to the current location area to the application device to enable the application device to provide the augmented-reality-based content resource package corresponding to the front location area for the user. That is, with the solution provided in the present application, the augmented-reality-based content resource package corresponding to the current location area can be acquired no matter at what location and in what pose the tourist collects the video stream, and the user can be guided in real time based on the augmented-reality-based content resource package. However, in a tour guiding method in the related art, multiangular recognition and triggering are not allowed so that the content of audio interpretation does not match the sightline of the tourist in real time. In the present application, the technique of determining, based on the collected video stream and the prestored three-dimensional point cloud data of the target scenic spot, the augmented-reality-based content resource package corresponding to the current location area is used to overcome the problem in which multiangular recognition and triggering are not allowed in a navigation method in the related art and thus the content of audio interpretation cannot match the sightline of the tourist in real time in the navigation method in the related art. With the solution provided in the present application, a service can be triggered in multiple orientations and at multiple angles, the content of interpretation can match the sightline of the tourist in real time, and thus the tour experience of the user can be improved. Moreover, the solution provided in this embodiment of the present application is easy to implement and popularize and is wider in application range.

Embodiment Two

Figure 2:
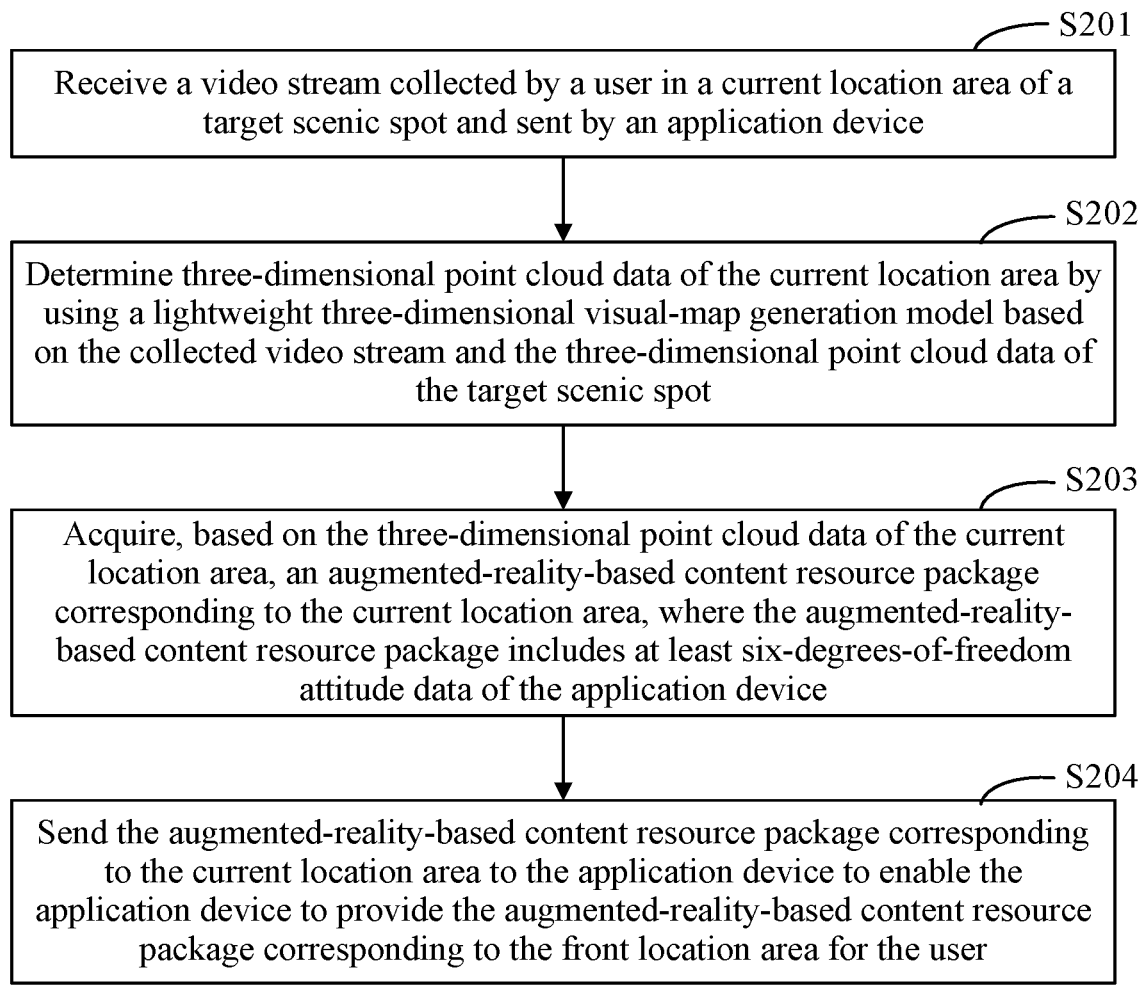
FIG. 2 is a second flowchart of a tour guiding method according to an embodiment of the present application.

FIG. 2 is a second flowchart of a tour guiding method according to an embodiment of the present application. As shown in FIG. 2, the tour guiding method may include the steps below.

In S201, a video stream collected by a user in a current location area of a target scenic spot and sent by an application device is received.

In S202, three-dimensional point cloud data of the current location area is determined using a lightweight three-dimensional visual-map generation model based on the collected video stream and the three-dimensional point cloud data of the target scenic spot.

In this step, the server device may determine the three-dimensional point cloud data of the current location area by using the lightweight three-dimensional visual-map generation model based on the collected video stream and the three-dimensional point cloud data of the target scenic spot. In an embodiment, the server device may first extract, from the video stream collected by the user, a local feature of the video stream and then match the local feature of the video stream to multiple features of the three-dimensional point cloud data of the target scenic spot; and if the local feature of the video stream can match at least one feature of the three-dimensional point cloud data of the target scenic spot successfully, the server device may determine the three-dimensional point cloud data of the current location area based on the successfully matched feature.

In S203, an augmented-reality-based content resource package corresponding to the current location area is acquired based on the three-dimensional point cloud data of the current location area, where the augmented-reality-based content resource package includes at least six-degrees-of-freedom attitude data of the application device.

In this step, the server device may acquire, based on the three-dimensional point cloud data of the current location area, the augmented-reality-based content resource package corresponding to the current location area, where the augmented-reality-based content resource package includes at least the six-degrees-of-freedom attitude data of the application device. in an embodiment, the server device may search a preconstructed visual-map database for the three-dimensional point cloud data of the current location area; and if the three-dimensional point cloud data of the current location area is found in the visual-map database, the augmented-reality-based content resource package corresponding to the current location area is acquired from the preconstructed visual-map database.

In S204, the augmented-reality-based content resource package corresponding to the current location area is sent to the application device to enable the application device to provide the augmented-reality-based content resource package corresponding to the front location area for the user.

In an implementation of the present application, before determining, based on the collected video stream and the prestored three-dimensional point cloud data of the target scenic spot, the augmented-reality-based content resource package corresponding to the current location area, the server device may classify the collected video stream to obtain a visual-map data category corresponding to the collected video stream and then extract the three-dimensional point cloud data of the target scenic spot from the preconstructed visual-map database based on the visual-map data category corresponding to the collected video stream.

In an implementation of the present application, the server device may also receive a video recorded for the target scenic spot and sent by a production device; and then generate the three-dimensional point cloud data of the target scenic spot based on the video recorded for the target scenic spot and store the three-dimensional point cloud data of the target scenic spot in the visual-map database. A collection app installed at the production device records an omni-orientational full video resource for a scenic spot whose data is required to be collected. A method for recording and collecting visual information at the level of a scenic spot (for example, a large building or a courtyard house) is provided. This method defines an optimal experience area of a user at a scenic spot. In the experience area, the angles of view of an experiencer in different orientations are imitated, and data is collected in a movable and dynamic manner. In this manner, during image comparison and calculation in final three-dimensional reconstruction and real-time application, the position and angle of view of the experiencer in practical application can be estimated. For example, in response to the target scenic spot being a single wall, the server device may receive a video recorded for the target scenic spot by using a data collection method corresponding to the single wall and sent by the production device; in response to the target scenic spot being a single building, the server device may receive a video recorded for the target scenic spot by using a data collection method corresponding to the single building and sent by the production device; and in response to the target scenic spot being a courtyard type building, the server device may receive a video recorded for the target scenic spot by using a data collection method corresponding to the courtyard type building and sent by the production device.

For example, in an implementation of the present application, before generating the three-dimensional point cloud data of the target scenic spot based on the video recorded for the target scenic spot, the server device may analyze feasibility for the video recorded for the target scenic spot to obtain the feasibility analysis result of the video recorded for the target scenic spot; in response to the feasibility analysis result of the video recorded for the target scenic spot being feasible, the server device may perform the operation of generating the three-dimensional point cloud data of the target scenic spot based on the video recorded for the target scenic spot; and in response to the feasibility analysis result of the video recorded for the target scenic spot being infeasible, the server device may discard the video recorded for the target scenic spot.

Figure 3:
FIG. 3 is a diagram illustrating recording using a data collection method corresponding to a single wall according to an embodiment of the present application.
Figure 3:

FIG. 3 is a diagram illustrating recording using a data collection method corresponding to a single wall according to an embodiment of the present application. FIG. 3 shows a scenario where the target scenic spot is similar to a wall. Each small arrow of FIG. 3 indicates the orientation of a camera and indicates that a user is required to move a collection device laterally and is not allowed to rotate the collection device in situ. In such a scenario, the camera required to face the wall. It is to be noted that when a video is recorded, the collection device is required to face the target, and the user holding the production device may move in an S-shape route to get close to the target.

Figure 4:
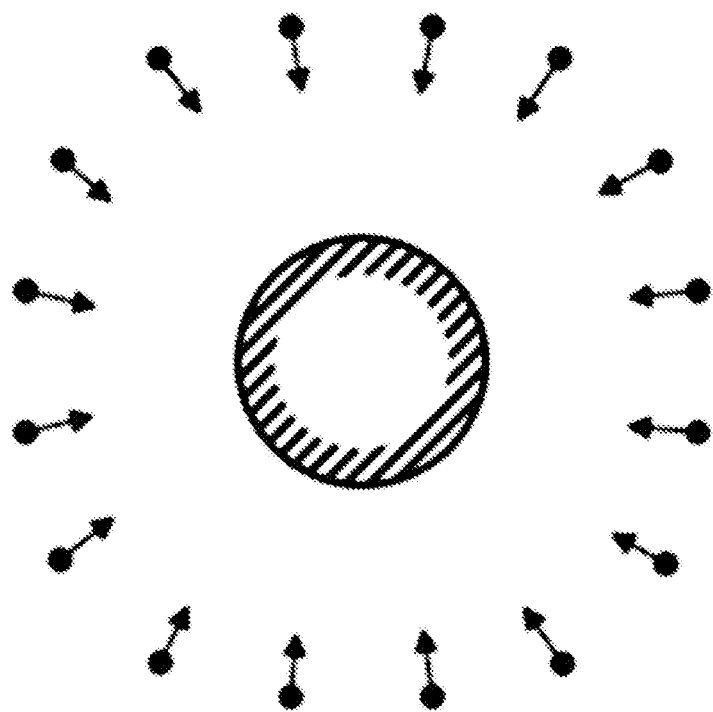
FIG. 4 is a diagram illustrating recording using a data collection method corresponding to a single building according to an embodiment of the present application.

FIG. 4 is a diagram illustrating recording using a data collection method corresponding to a single building according to an embodiment of the present application. FIG. 4 shows a scenario where the target scenic spot is similar to a separate building. A production device is required to face the target and then rotate around the target. It is to be noted that a user who holds the production device is required to walk at a uniform speed instead of running. In such a scenario, the user is required to make a camera face three buildings.

Figure 5:
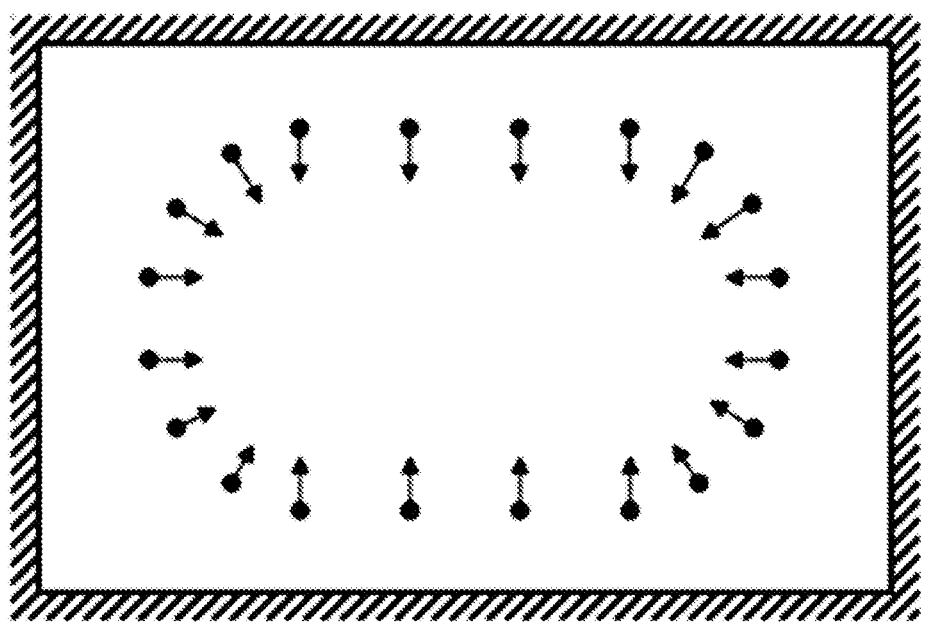
FIG. 5 is a diagram illustrating recording using a data collection method corresponding to a courtyard type building according to an embodiment of the present application.

FIG. 5 is a diagram illustrating recording using a data collection method corresponding to a courtyard type building according to an embodiment of the present application. FIG. 5 shows a scenario where the target scenic spot is similar to a courtyard house. The camera of a production device faces the middle of the courtyard house. A user holding the production device walks around the courtyard house at a uniform speed instead of rotating in situ. In such a scenario, the camera is required to face both sides of a travel route separately.

In the tour guiding method provided in this embodiment of the present application, a server device receives a video stream collected by a user in a current location area of a target scenic spot and sent by an application device; the server device determines, based on the collected video stream and prestored three-dimensional point cloud data of the target scenic spot, an augmented-reality-based content resource package corresponding to the current location area; and then the server device sends the augmented-reality-based content resource package corresponding to the current location area to the application device to enable the application device to provide the augmented-reality-based content resource package corresponding to the front location area for the user. That is, with the solution provided in the present application, the augmented-reality-based content resource package corresponding to the current location area can be acquired no matter at what location and in what pose the tourist collects the video stream, and the user can be guided in real time based on the augmented-reality-based content resource package. However, in a tour guiding method in the related art, multiangular recognition and triggering are not allowed, so that the content of audio interpretation does not match the sightline of the tourist in real time. In the present application, the technique of determining, based on the collected video stream and the prestored three-dimensional point cloud data of the target scenic spot, the augmented-reality-based content resource package corresponding to the current location area is used to overcome the problem in which multiangular recognition and triggering are not allowed in a navigation method in the related art and thus the content of audio interpretation cannot match the sightline of the tourist in real time in the navigation method in the related art. With the solution provided in the present application, a service can be triggered in multiple orientations and at multiple angles, the content of interpretation can match the sightline of the tourist in real time, and thus the tour experience of the user can be improved. Moreover, the solution provided in this embodiment of the present application is easy to implement and popularize and is wider in application range.

Embodiment Three

Figure 6:
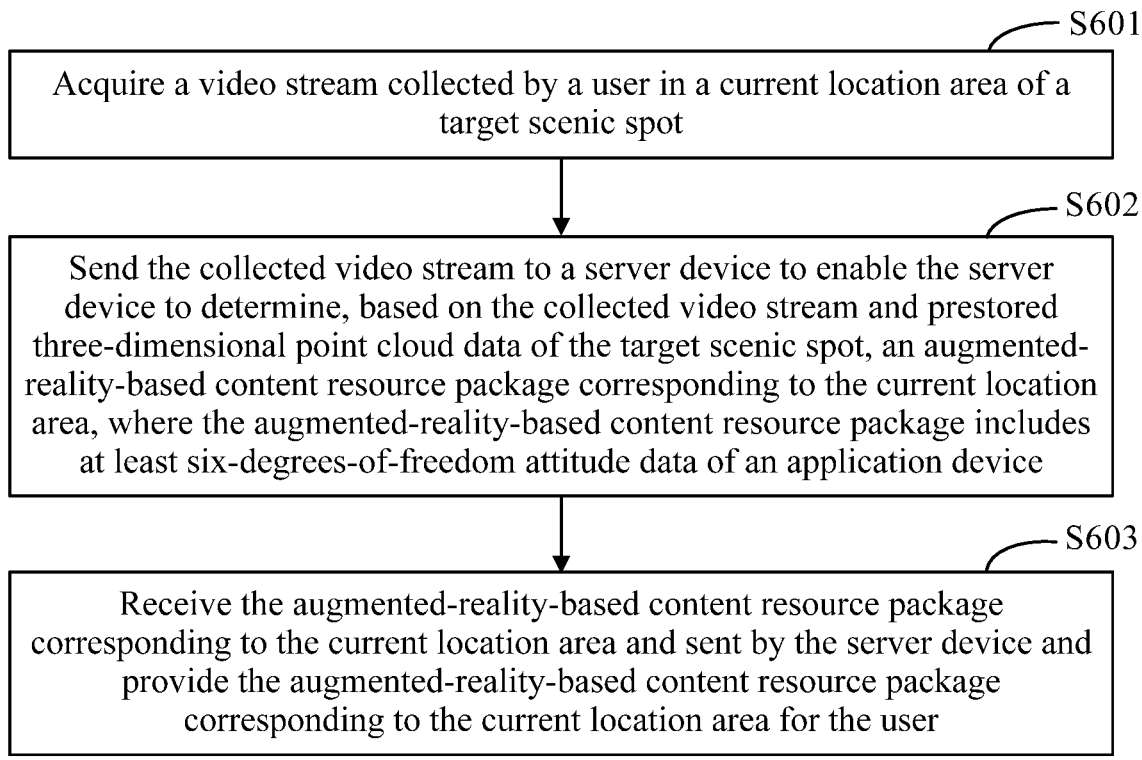
FIG. 6 is a third flowchart of a tour guiding method according to an embodiment of the present application.

FIG. 6 is a third flowchart of a tour guiding method according to an embodiment of the present application. The method may be performed by a tour guiding apparatus or an application device. The apparatus or the application device may be implemented as software and/or hardware. The apparatus or the application device may be integrated in any intelligent device having the network communication function. As shown in FIG. 6, the tour guiding method may include the steps below.

In S601, a video stream collected by a user in a current location area of a target scenic spot is acquired.

In this step, the application device may acquire the video stream collected by the user in the current location area of the target scenic spot. In an embodiment, the user may turn on a camera in the current location area of the target scenic spot, locally collect a video stream in real time, and perform continuous visual positioning and search. For example, when the user visits Mount Tai, assuming that the user enters through the east gate and then walks 100 meters west, the user may use a mobile terminal to collect a video stream while walking, send the collected video stream to the server device in real time.

In S602, the collected video stream is sent to a server device to enable the server device to determine, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of an application device.

In this step, the application device may send the collected video stream to the server device to enable the server device to determine, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of the application device. For example, the application device may first store the collected video stream to a local database and then send the collected video stream to the server device based on the local database. In this manner, the application device can continue the collection while sending the video stream, thereby achieving the purpose of real-time tour guiding.

In S603, the augmented-reality-based content resource package corresponding to the current location area and sent by the server device is received, and the augmented-reality-based content resource package corresponding to the current location area is provided for the user.

In this step, the application device may receive the augmented-reality-based content resource package corresponding to the current location area and sent by the server device and provide the augmented-reality-based content resource package corresponding to the current location area for the user. In an embodiment, an application-level app product such as a smartphone can invoke and display a customized scenic-spot AR content resource package and provide an intelligent scenic-spot AR tour escort application service for a user of an intelligent terminal device by integrating a visual positioning service (VPS) interface and invoking a cloud VPS API service, client SLAM/VO instant positioning and map construction based on a monocular camera, and a software development kit (SDK) of a 3D content rendering engine module.

In the present application, a combination of a large-scenario visual-map search and positioning service and an image-based tracking technology is applied to a scenic-spot intelligent tour guiding scenario to enable POI visual search and AR content triggering services of multiple scenic spots; recommendation and sequential display of AR content are performed through distance and angle-of-view estimation between a user and multiple real-scenario knowledge points so that the content browsing experience is improved; a TTS broadcast service is used to reduce the development cost, help a user to better understand knowledge points contained in a scenic spot, and improve the interactive operation experience; and initial positioning is performed in conjunction with a GPS-based LBS map positioning service so that the visual-map search efficiency is improved. The technical solution provided in the present application can cover all smartphones on the market and can provide real-time visual positioning and tracking services simply by using an ordinary camera.

In the tour guiding method provided in this embodiment of the present application, a server device receives a video stream collected by a user in a current location area of a target scenic spot and sent by an application device; the server device determines, based on the collected video stream and prestored three-dimensional point cloud data of the target scenic spot, an augmented-reality-based content resource package corresponding to the current location area; and then the server device sends the augmented-reality-based content resource package corresponding to the current location area to the application device to enable the application device to provide the augmented-reality-based content resource package corresponding to the front location area for the user. That is, with the solution provided in the present application, the augmented-reality-based content resource package corresponding to the current location area can be acquired no matter at what location and in what pose the tourist collects the video stream, and the user can be guided in real time based on the augmented-reality-based content resource package. However, in a tour guiding method in the related art, multiangular recognition and triggering are not allowed, so that the content of audio interpretation does not match the sightline of the tourist in real time. In the present application, the technique of determining, based on the collected video stream and the prestored three-dimensional point cloud data of the target scenic spot, the augmented-reality-based content resource package corresponding to the current location area is used to overcome the problem in which multiangular recognition and triggering are not allowed in a navigation method in the related art and thus the content of audio interpretation cannot match the sightline of the tourist in real time in the navigation method in the related art. With the solution provided in the present application, a service can be triggered in multiple orientations and at multiple angles, the content of interpretation can match the sightline of the tourist in real time, and thus the tour experience of the user can be improved. Moreover, the solution provided in this embodiment of the present application is easy to implement and popularize and is wider in application range.

Embodiment Four

Figure 7:
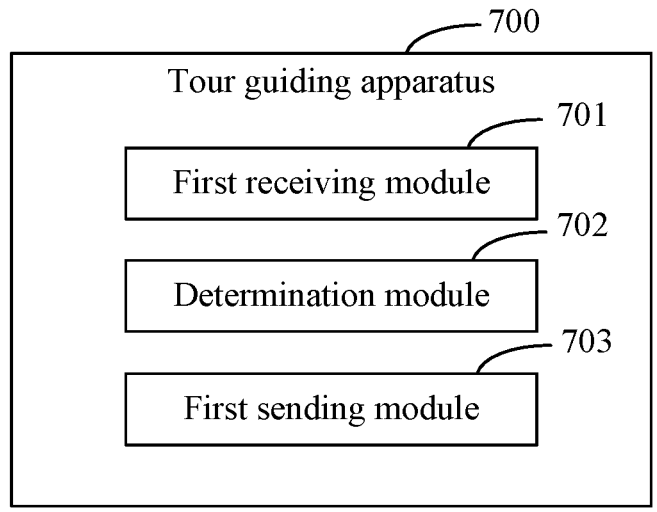
FIG. 7 is a first diagram illustrating the structure of a tour guiding apparatus according to an embodiment of the present application.

FIG. 7 is a first diagram illustrating the structure of a tour guiding apparatus according to an embodiment of the present application. As shown in FIG. 7, the apparatus 700 includes a first receiving module 701, a determination module 702 and a first sending module 703.

The first receiving module 701 is configured to receive a video stream collected by a user in a current location area of a target scenic spot and sent by an application device.

The determination module 702 is configured to determine, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of the application device.

The first sending module 703 is configured to send the augmented-reality-based content resource package corresponding to the current location area to the application device to enable the application device to provide the augmented-reality-based content resource package corresponding to the front location area for the user.

Further, the apparatus 700 further includes an extraction module 704 (not shown) configured to classify the collected video stream to obtain a visual-map data category corresponding to the collected video stream; and extract the three-dimensional point cloud data of the target scenic spot from a preconstructed visual-map database based on the visual-map data category corresponding to the collected video stream.

Figure 8:
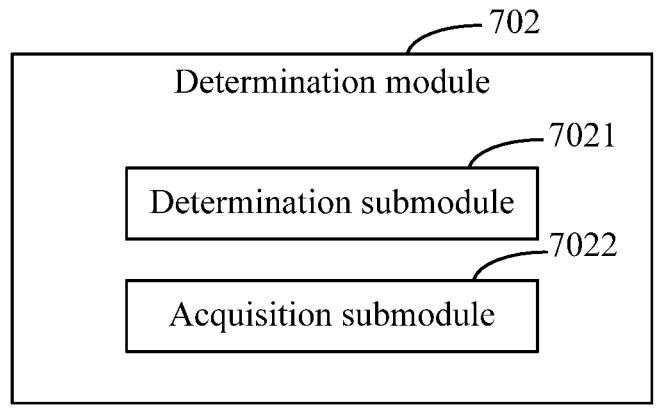
FIG. 8 is a diagram illustrating the structure of a determination module according to an embodiment of the present application.

FIG. 8 is a diagram illustrating the structure of a determination module according to an embodiment of the present application. As shown in FIG. 8, the determination module 702 includes a determination submodule 7021 and an acquisition submodule 7022.

The determination submodule 7021 is configured to determine three-dimensional point cloud data of the current location area by using a lightweight three-dimensional visual-map generation model based on the collected video stream and the three-dimensional point cloud data of the target scenic spot.

The acquisition submodule 7022 is configured to acquire, based on the three-dimensional point cloud data of the current location area, the augmented-reality-based content resource package corresponding to the current location area.

The tour guiding apparatus can perform the method provided in embodiments one and two of the present application and has function modules and beneficial effects corresponding to the performed method. For technical details not described in detail in this embodiment, see the tour guiding method provided in embodiments one and two of the present application.

Embodiment Five

Figure 9:
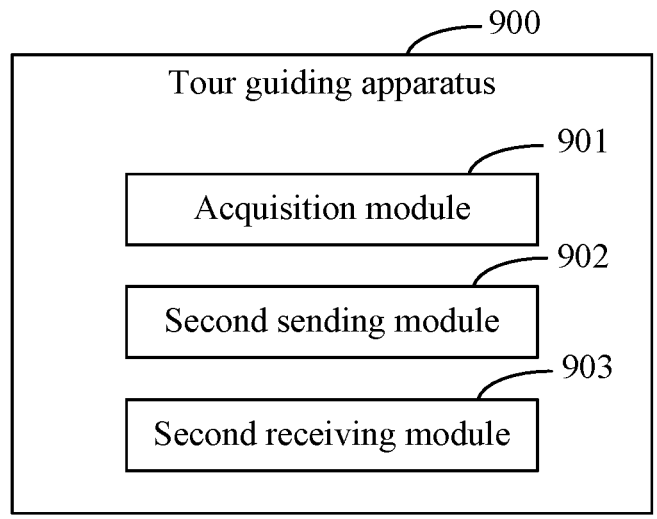
FIG. 9 is a second diagram illustrating the structure of a tour guiding apparatus according to an embodiment of the present application.

FIG. 9 is a second diagram illustrating the structure of a tour guiding apparatus according to an embodiment of the present application. As shown in FIG. 9, the apparatus 900 includes an acquisition module 901, a second sending module 902 and a second receiving module 903.

The acquisition module 901 is configured to acquire a video stream collected by a user in a current location area of a target scenic spot.

The second sending module 902 is configured to send the collected video stream to a server device to enable the server device to determine, based on the collected video stream and prestored three-dimensional point cloud data of the target scenic spot, an augmented-reality-based content resource package corresponding to the current location area, where the augmented-reality-based content resource package includes at least six-degrees-of-freedom attitude data of an application device.

The second receiving module 903 is configured to receive the augmented-reality-based content resource package corresponding to the current location area and sent by the application device and provide the augmented-reality-based content resource package corresponding to the current location area for the user.

The augmented-reality-based tour guiding apparatus can perform the method provided in embodiment three of the present application and has function modules and beneficial effects corresponding to the performed method. For technical details not described in detail in this embodiment, see the tour guiding method provided in embodiment three of the present application.

Embodiment Six

According to an embodiment of the present application, the present application further provides an electronic device and a readable storage medium.

Figure 10:
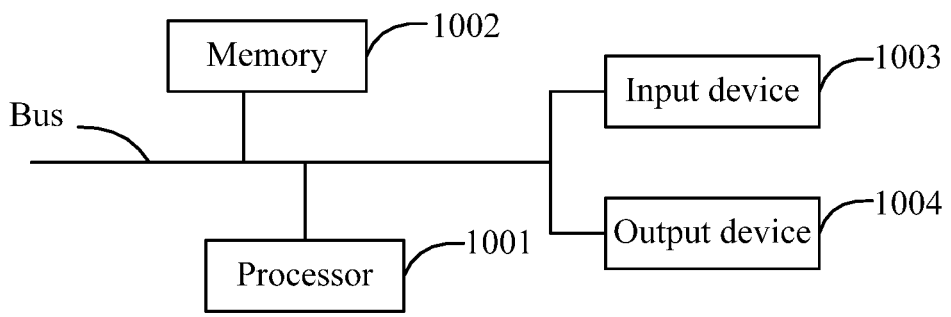
FIG. 10 is a block diagram of an electronic device for performing a tour guiding method according to an embodiment of the present application.

FIG. 10 is a block diagram of an electronic device for performing a tour guiding method according to an embodiment of the present application. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present application as described and/or required herein.

As shown in FIG. 10, the electronic device includes one or more processors 1001, a memory 1002, and interfaces for connecting components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a GUI displayed on an external input/output device (for example, a display device coupled to an interface). In other embodiments, if required, multiple processors and/or multiple buses may be used with multiple memories. Similarly, multiple electronic devices may be connected, each providing some necessary operations (for example, a server array, a set of blade servers or a multi-processor system). FIG. 10 shows one processor 1001 by way of example.

The memory 1002 is the non-transitory computer-readable storage medium provided in the present application. The memory stores instructions executable by at least one processor to cause the at least one processor to perform the tour guiding method provided in the present application. The non-transitory computer-readable storage medium of the present application stores computer instructions for causing a computer to perform the tour guiding method provided in the present application.

The memory 1002 as a non-transitory computer-readable storage medium is configured to store a non-transitory software program, a non-transitory computer-executable program, and modules, for example, program instructions/modules corresponding to the tour guiding method provided in embodiments of the present application (for example, the first receiving module 701, the determination module 702 and the first sending module 703 shown in FIG. 7). The processor 1001 executes non-transitory software programs, instructions and modules stored in the memory 1002 to execute the various function applications and data processing of a server, that is, implement the tour guiding method provided in the preceding method embodiments.

The memory 1002 may include a program storage region and a data storage region. The program storage region may store an operating system and an application program required by at least one function. The data storage region may store data created based on the use of the electronic device for performing the tour guiding method. Additionally, the memory 1002 may include a high-speed random-access memory and a non-transitory memory, for example, at least one disk memory, a flash memory or another non-transitory solid-state memory. In some embodiments, the memory 1002 optionally includes memories disposed remote from the processor 1001, and these remote memories may be connected, through a network, to the electronic device for the tour guiding method. Examples of the preceding network include, but are not limited to, the Internet, an intranet, a local area network, a mobile communication network and a combination thereof.

The electronic device for the tour guiding method may further include an input device 1003 and an output device 1004. The processor 1001, the memory 1002, the input device 1003 and the output device 1004 may be connected by a bus or in other manners. FIG. 10 uses connection by a bus as an example.

The input device 1003 can receive input number or character information and generate key signal input related to user settings and function control of the electronic device for the tour guiding method. The input device 1003 may be, for example, a touchscreen, a keypad, a mouse, a trackpad, a touchpad, a pointing stick, one or more mouse buttons, a trackball or a joystick. The output device 1004 may be, for example, a display device, an auxiliary lighting device (for example, an LED) or a haptic feedback device (for example, a vibration motor). The display device may include, but is not limited to, a liquid-crystal display (LCD), a light-emitting diode (LED) display or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

In the technical solution of this embodiment of the present application, a server device receives a video stream collected by a user in a current location area of a target scenic spot and sent by an application device; the server device determines, based on the collected video stream and prestored three-dimensional point cloud data of the target scenic spot, an augmented-reality-based content resource package corresponding to the current location area; and then the server device sends the augmented-reality-based content resource package corresponding to the current location area to the application device to enable the application device to provide the augmented-reality-based content resource package corresponding to the front location area for the user. That is, with the solution provided in the present application, the augmented-reality-based content resource package corresponding to the current location area can be acquired no matter at what location and in what pose the tourist collects the video stream, and the user can be guided in real time based on the augmented-reality-based content resource package. However, in a tour guiding method in the related art, multiangular recognition and triggering are not allowed, so that the content of audio interpretation does not match the sightline of the tourist in real time. In the present application, the technique of determining, based on the collected video stream and the prestored three-dimensional point cloud data of the target scenic spot, the augmented-reality-based content resource package corresponding to the current location area is used to overcome the problem in which multiangular recognition and triggering are not allowed in a navigation method in the related art and thus the content of audio interpretation cannot match the sightline of the tourist in real time in the navigation method in the related art. With the solution provided in the present application, a service can be triggered in multiple orientations and at multiple angles, the content of interpretation can match the sightline of the tourist in real time, and thus the tour experience of the user can be improved. Moreover, the solution provided in this embodiment of the present application is easy to implement and popularize and is wider in application range.

It is to be understood that various forms of the preceding flows may be used, with steps reordered, added or removed. For example, the steps described in the present application may be executed in parallel, in sequence or in a different order as long as the desired result of the technical solution disclosed in the present application is achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. A tour guiding method, comprising:
receiving a video stream collected by a user in a current location area of a target scenic spot and sent by an application device;
determining, based on the collected video stream and prestored three-dimensional point cloud data of the target scenic spot, an augmented-reality-based content resource package corresponding to the current location area, wherein the augmented-reality-based content resource package comprises at least six-degrees-of-freedom attitude data of the application device; and
sending the augmented-reality-based content resource package corresponding to the current location area to the application device to enable the application device to provide the augmented-reality-based content resource package corresponding to the front location area for the user;

before determining, based on the collected video stream and the prestored three-dimensional point cloud data of the target scenic spot, the augmented-reality-based content resource package corresponding to the current location area, the method further comprising:

classifying the collected video stream to obtain a visual-map data category corresponding to the collected video stream; and extracting, based on the visual-map data category corresponding to the collected video stream, the three-dimensional point cloud data of the target scenic spot from a preconstructed visual-map database.

2. The method of claim 1, wherein determining, based on the collected video stream and the prestored three-dimensional point cloud data of the target scenic spot, the augmented-reality-based content resource package corresponding to the current location area comprises:

determining, based on the collected video stream and the three-dimensional point cloud data of the target scenic spot, three-dimensional point cloud data of the current location area by using a lightweight three-dimensional visual-map generation model; and acquiring, based on the three-dimensional point cloud data of the current location area, the augmented-reality-based content resource package corresponding to the current location area.

3. The method of claim 1, before receiving the video stream collected by the user in the current location area of the target scenic spot and sent by the application device, the method further comprising:

receiving a video recorded for the target scenic spot and sent by a production device; and generating the three-dimensional point cloud data of the target scenic spot based on the video recorded for the target scenic spot and storing the three-dimensional point cloud data of the target scenic spot in the visual-map database.

4. The method of claim 3, wherein receiving the video recorded for the target scenic spot and sent by the production device comprises:

in response to the target scenic spot being a single wall, receiving a video recorded for the target scenic spot by using a data collection method corresponding to the single wall and sent by the production device; in response to the target scenic spot being a single building, receiving a video recorded for the target scenic spot by using a data collection method corresponding to the single building and sent by the production device; in response to the target scenic spot being a courtyard type building, receiving a video recorded for the target scenic spot by using a data collection method corresponding to the courtyard type building and sent by the production device.

5. The method of claim 3, before generating the three-dimensional point cloud data of the target scenic spot based on the video recorded for the target scenic spot, the method further comprising:

analyzing feasibility for the video recorded for the target scenic spot to obtain a feasibility analysis result of the video recorded for the target scenic spot; and in response to the feasibility analysis result of the video recorded for the target scenic spot being feasible, performing the operation of generating the three-dimensional point cloud data of the target scenic spot based on the video recorded for the target scenic spot.

6. A tour guiding method, comprising:

acquiring a video stream collected by a user in a current location area of a target scenic spot;

sending the collected video stream to a server device to enable the server device to determine, based on the collected video stream and prestored three-dimensional point cloud data of the target scenic spot, an augmented-reality-based content resource package corresponding to the current location area, wherein the augmented-reality-based content resource package comprises at least six-degrees-of-freedom attitude data of an application device; and receiving the augmented-reality-based content resource package corresponding to the current location area and sent by the server device and providing the augmented-reality-based content resource package corresponding to the current location area for the user;

wherein, before the server device is configured to determine, based on the collected video stream and the prestored three-dimensional point cloud data of the target scenic spot, the augmented-reality-based content resource package corresponding to the current location area, the server device is further configured to:

classify the collected video stream to obtain a visual-map data category corresponding to the collected video stream; and extract, based on the visual-map data category corresponding to the collected video stream, the three-dimensional point cloud data of the target scenic spot from a preconstructed visual-map database.

7. The method of claim 6, wherein providing the augmented-reality-based content resource package corresponding to the current location area for the user comprises:

providing, based on a location-based service (LBS) of the Global Positioning System (GPS), the augmented-reality-based content resource package corresponding to the current location area for the user; or providing, based on a text-to-speech (TTS) audio broadcast service, the augmented-reality-based content resource package corresponding to the current location area for the user.

8. A non-transitory computer-readable storage medium, storing computer instructions for causing a computer to perform the method of claim 6.

9. An electronic device, comprising:

at least one processor; and a memory communicatively connected to the at least one processor, wherein the memory stores instructions executable by the at least one processor to enable the at least one processor to perform the following steps:

receiving a video stream collected by a user in a current location area of a target scenic spot and sent by an application device;

determining, based on the collected video stream and prestored three-dimensional point cloud data of the target scenic spot, an augmented-reality-based content resource package corresponding to the current location area, wherein the augmented-reality-based content resource package comprises at least six-degrees-of-freedom attitude data of the application device; and sending the augmented-reality-based content resource package corresponding to the current location area to the application device to enable the application device to provide the augmented-reality-based content resource package corresponding to the front location area for the user;

wherein the at least one processor is configured to further perform, before determining, based on the collected video stream and the prestored three-dimensional point cloud data of the target scenic spot, the augmented-reality-based content resource package corresponding to the current location area, the following steps:

classifying the collected video stream to obtain a visual-map data category corresponding to the collected video stream; and extracting, based on the visual-map data category corresponding to the collected video stream, the three-dimensional point cloud data of the target scenic spot from a preconstructed visual-map database.

10. The electronic device of claim 9, wherein the at least one processor is configured to perform determining, based on the collected video stream and the prestored three-dimensional point cloud data of the target scenic spot, the augmented-reality-based content resource package corresponding to the current location area by:

determining, based on the collected video stream and the three-dimensional point cloud data of the target scenic spot, three-dimensional point cloud data of the current location area by using a lightweight three-dimensional visual-map generation model; and acquiring, based on the three-dimensional point cloud data of the current location area, the augmented-reality-based content resource package corresponding to the current location area.

11. The electronic device of claim 9, the at least one processor is configured to further perform, before receiving the video stream collected by the user in the current location area of the target scenic spot and sent by the application device, the following steps:

receiving a video recorded for the target scenic spot and sent by a production device; and generating the three-dimensional point cloud data of the target scenic spot based on the video recorded for the target scenic spot and storing the three-dimensional point cloud data of the target scenic spot in the visual-map database.

12. The electronic device of claim 11, wherein the at least one processor is configured to perform receiving the video recorded for the target scenic spot and sent by the production device by:

in response to the target scenic spot being a single wall, receiving a video recorded for the target scenic spot by using a data collection method corresponding to the single wall and sent by the production device; in response to the target scenic spot being a single building, receiving a video recorded for the target scenic spot by using a data collection method corresponding to the single building and sent by the production device; in response to the target scenic spot being a courtyard type building, receiving a video recorded for the target scenic spot by using a data collection method corresponding to the courtyard type building and sent by the production device.

13. The electronic device of claim 11, the at least one processor is configured to further perform, before generating the three-dimensional point cloud data of the target scenic spot based on the video recorded for the target scenic spot, the following steps:

analyzing feasibility for the video recorded for the target scenic spot to obtain a feasibility analysis result of the video recorded for the target scenic spot; and in response to the feasibility analysis result of the video recorded for the target scenic spot being feasible, performing the operation of generating the three-dimensional point cloud data of the target scenic spot based on the video recorded for the target scenic spot.

14. An electronic device, comprising:

at least one processor; and a memory communicatively connected to the at least one processor, wherein the memory stores instructions executable by the at least one processor to enable the at least one processor to perform the method of claim 6.

15. The electronic device of claim 14, wherein the at least one processor is configured to perform providing the augmented-reality-based content resource package corresponding to the current location area for the user by:

providing, based on a location-based service (LBS) of the Global Positioning System (GPS), the augmented-reality-based content resource package corresponding to the current location area for the user; or providing, based on a text-to-speech (TTS) audio broadcast service, the augmented-reality-based content resource package corresponding to the current location area for the user.

16. A non-transitory computer-readable storage medium, storing computer instructions for causing a computer to perform the method of claim 1.

17. The storage medium of claim 16, wherein the computer is configured to perform determining, based on the collected video stream and the prestored three-dimensional point cloud data of the target scenic spot, the augmented-reality-based content resource package corresponding to the current location area by:

determining, based on the collected video stream and the three-dimensional point cloud data of the target scenic spot, three-dimensional point cloud data of the current location area by using a lightweight three-dimensional visual-map generation model; and acquiring, based on the three-dimensional point cloud data of the current location area, the augmented-reality-based content resource package corresponding to the current location area.

* * * * *